UNITED STATES PATENT OFFICE.

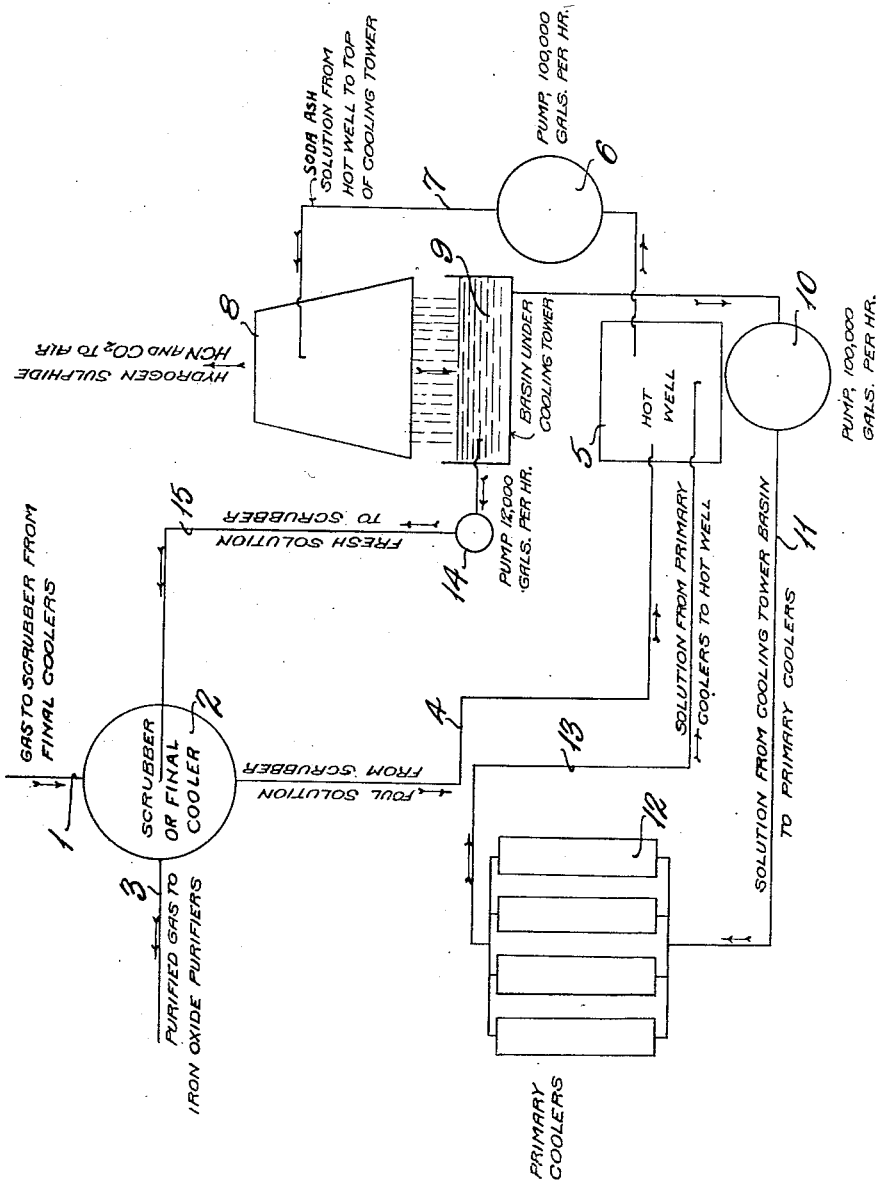

CHARLES J. RAMSBURG, OF PITTSBURGH, PENNSYLVANIA, ASSIGNOR TO THE KOPPERS COMPANY, A CORPORATION OF PENNSYLVANIA.

APPARATUS AND PROCESS FOR PURIFYING GASES.

1,389,980.  Specification of Letters Patent.  Patented Sept. 6, 1921.

Application filed October 7, 1920. Serial No. 415,230.

*To all whom it may concern:*

Be it known that I, CHARLES J. RAMSBURG, a citizen of the United States, residing in Pittsburgh, in the county of Allegheny and State of Pennsylvania, have invented a new and useful Improvement in Apparatus and Processes for Purifying Gases, of which the following is a specification.

This invention relates to the treatment of fuel gases, such for example as coke oven gas, and has for an object to effect an efficient purification of the gas, while it flows continuously, by an absorption and removal from the gas of obnoxious constituents such as sulfur compounds principally in the form of hydrogen sulfid. These sulfur compounds become obnoxious especially when the gas is consumed, and, to avoid this, it is a common practice to pass the gas through boxes containing quantities of iron oxid before allowing the gas to flow into the mains. The iron oxid functions to absorb these deleterious sulfur compounds from the gas but the iron oxid boxes have to be frequently cleaned and replenished and are consequently expensive to maintain. By the use of the present invention, the quantity of iron oxid necessary to insure purification of the gas is reduced to a minimum, inasmuch as the improved purification process removes substantially all of the sulfur compounds from the gas before the gas passes into any iron oxid boxes on its way to the mains.

A further object of the invention is to provide an efficient aeration process for regenerating the gas purifying agent after such agent has absorbed the sulfur compounds from the gas, such aeration process being effective to cause the purifying agent to give up its sulfur, thereby permitting a constant reflux of the purifying agent back to the gas purifying process, with a consequent reduction in the quantity of purifying agent needed for carrying out the process of absorption of sulfur from the gas, enabling the process to be carried out economically and without waste.

In addition to the general objects recited above, the invention has for further objects such other improvements or advantages in operation and results as are found to obtain in the apparatus and processes hereinafter described or claimed.

In the accompanying drawing, forming a part of this specification, and showing, for purposes of exemplification a preferred form and manner in which the invention may be embodied and practised, but without limiting the claimed invention specifically to such illustrated instance or instances:

The figure illustrates a diagrammatic representation of apparatus for carrying out the improved gas purifying process of the present invention.

In its present embodiment, the invention is applied to the purification of coke oven gas, and, for convenience, the present description will be confined to this use of the invention. The features of the invention are, however, readily susceptible of other valuable applications and consequently the scope of the invention is by no means confined to the specific use and specific embodiment herein described as an illustrative example.

For effecting the absorption of the sulfur compounds from the gas, there is employed a water solution of an alkaline compound having an affinity or hydrogen sulfid. A number of the compounds of the alkali metals and alkaline earths possess this property. A solution of sodium carbonate in water is especially suitable for effecting the absorption of sulfur from the gas, because of the great affinity which a water solution of sodium carbonate has for hydrogen sulfid and because of the cheapness and availability of this sodium salt. A solution of sodium carbonate is strongly basic in its properties. When sodium carbonate dissolved in water is brought into contact with gas, such as coke oven gas, containing carbon dioxid and hydrogen sulfid, carbon dioxid is absorbed, and sodium bicarbonate is formed, as may, for example, be illustrated by the following equation:

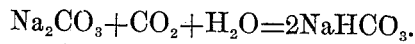
$$Na_2CO_3 + CO_2 + H_2O = 2NaHCO_3.$$

The solution of sodium carbonate will also effect the absorption of such sulfur compounds as hydrogen sulfid, $H_2S$, from the gas. The absorption of hydrogen sulfid by the sodium carbonate solution may be illustrated by the following equation:

$$Na_2CO_3 + H_2S = NaHCO_3 + NaHS.$$

In applying the above to the absorption of sulfur from a gas, it is preferable to use a dilute solution of sodium carbonate in water. A concentration from about two to five percentum of sodium carbonate in the solution will be found satisfactory. In the form of the invention illustrated in the figure, the coke oven gas is passed through a gas line 1 into a scrubber 2, such as an ordinary benzol scrubber, in which it passes up through a descending current of sodium carbonate solution, which effects the absorption of the hydrogen sulfid from the gas. Passing out of the scrubber 2, the substantially purified gas flows through a gas line 3 to iron oxid boxes, which are employed for absolute safety. However, substantially the entire content of sulfur is absorbed from the gas in the scrubber 2 and little, if any, sulfur remains in the gas as it passes through the iron oxid boxes. Consequently the quantity of iron oxid may be greatly reduced and the upkeep of the iron oxid boxes will involve but a small expense, as compared with present practice in which the entire quantity of sulfur is absorbed by the iron oxid, necessitating frequent cleaning of the boxes and renewal of the iron oxid. Because of the basic property of the sodium carbonate solution, other acid constituents of the gas besides carbon dioxid and hydrogen sulfid will be absorbed; for example, the sodium carbonate solution will absorb hydrocyanic acid.

The foul sodium carbonate solution containing the absorbed sulfur passes through a discharge line 4 to a hot well 5 and from the hot well 5 the foul solution is pumped by means of a pump 6 through another discharge line 7 to the top of the ordinary cooling tower 8. Flowing continuously down through the cooling tower 8, the foul solution is subjected to aeration caused by an upward draft of air through the cooling tower, and this aeration is effective to cause the foul solution to give up the hydrogen sulfid and other absorbed constituents and to become thoroughly rejuvenated and purified as it reaches the basin 9 underneath the cooling tower. The rejuvenation of the foul solution in the cooling tower is illustrated by means of the following equations:

$$2NaHCO_3 = Na_2CO_3 + CO_2 + H_2O.$$
$$2NaHS + CO_2 + H_2O = Na_2CO_3 + H_2S.$$

And also:
$$NaHCO_3 + NaHS = Na_2CO_3 + H_2S.$$

Rapid and thorough aeration greatly accelerates the foregoing reactions by rapidly removing the gaseous reaction products, as well as checking the formation of thiosulfate and the foul solution gives up its hydrogen sulfid and is regenerated. The rejuvenation process in the cooling tower may be augmented by increasing the content of carbon dioxid in the air circulated upwardly through the cooling tower. Instead of air, another similarly inert gas may be used.

In order to accelerate the above regenerative reactions, and to increase the rapidity of aeration by causing a strong updraft of air through the cooling tower, a large quantity of the purified solution in the basin 9 is heated and pumped back to the hot well in which it joins and greatly dilutes the foul solution that is flowing to the top of the cooling tower. From the basin 9, the rejuvenated solution is pumped by means of a pump 10 through a line 11 to heat exchange means such as the battery of ordinary primary coolers 12 and in said primary coolers 12 the solution is circulated in counter-current with the hot gas as it issues from the collecting main of a by-product coke oven. Thus the solution absorbs large quantities of heat before flowing through the line 13 to the hot well. The hot solution in the top of the tower promotes an updraft of air through the tower with a resultant increase in the aerating effect and a greater efficiency in the rejuvenating process carried on in the cooling tower. From the basin 9, a portion of the rejuvenated solution is pumped by a pump 14 through a fresh solution line 15 to the scrubber 2, thereby maintaining a constant recirculation of solution to the gas purification process. In practice the quantity of liquid flowing through the auxiliary circuit including the primary coolers is approximately nine times greater than that flowing through the main circuit including the scrubber. Hence the hot well 5 is being constantly replenished with heated rejuvenated solution which mixes with the relatively small quantity of foul solution from the scrubber, thereby diminishing the proportion of sulfur compounds in the total volume of solution that is pumped to the cooling tower, with a consequent dilution of the amount of impurities which must be driven off during the aeration step. As a result, the formation of thiosulfate, a mere inert material, is substantially minimized.

If desired, as shown on the drawing, an ordinary final cooler may be substituted for the scrubber in which the absorption of impurities from the gases is effected. Otherwise the apparatus is the same as that hereinabove described.

The invention as hereinabove set forth may be variously embodied within the scope of the claims hereinafter made.

Those features of invention exemplified in the foregoing description which relate broadly to the purification of gas by an alkaline absorbent agent, combined with the broad step of aerating the foul absorbent agent to effect its rejuvenation, are the invention of another and are made the subject matter of the co-pending application of David L. Jacobson for Letters Patent of the United States, filed October 22, 1920, Serial No. 418,810,

I claim:

1. In a process of purifying fuel gas, the combination of steps that consists in: continuously passing the gas through an absorbent agent to absorb the impurities from the gas, continuously discharging the absorbent agent containing the absorbed impurities and subjecting it to aeration to remove the absorbed impurities, continuously circulating a portion of the rejuvenated absorbent agent back to the gas purification step, heating another portion of the rejuvenated absorbent agent, commingling such heated portion with the foul absorbent agent from the gas purification step, and passing the thus diluted mixture back to the aeration process; substantially as specified.

2. In a process of purifying fuel gas, the combination of steps that consists in: continuously passing the gas through an absorbent agent to absorb the impurities from the gas, continuously discharging the absorbent agent containing the absorbed impurities and recirculating it downwardly through a cooler tower against an updraft of air to remove the absorbed impurities, continuously circulating a portion of rejuvenated absorbent agent back to the gas purification step, heating another portion of the rejuvenated absorbent agent, commingling such heated portion with the foul absorbent agent from the gas purification step, and passing the thus diluted mixture back to the cooling tower to augment the updraft of air through the solution being rejuvenated; substantially as specified.

3. In a process of purifying fuel gas, the combination of steps that consists in: continuously passing the gas through a sodium carbonate solution to absorb the hydrogen sulfid from the gas, continuously discharging the foul sodium carbonate solution and subjecting it to aeration to remove the absorbed hydrogen sulfid, continuously circulating a portion of the rejuvenated sodium carbonate solution back to the gas purification step, heating another portion of the rejuvenated sodium carbonate solution, commingling such heated portion with the foul solution from the gas purification step, and passing the thus diluted mixture back to the aeration process; substantially as specified.

4. In a process of purifying fuel gas, the combination of steps that consists in: continuously passing the gas through a sodium carbonate solution to absorb the hydrogen sulfid from the gas, continuously discharging the foul sodium carbonate solution and recirculating it downwardly through a cooling tower against an updraft of air to remove the absorbed hydrogen sulfid, continuously circulating a portion of the rejuvenated sodium carbonate solution back to the gas purification step, heating another portion of the rejuvenated sodium carbonate solution, commingling such heated portion with the foul solution from the gas purification step, passing the thus diluted mixture back to the cooling tower to augment the updraft of air through the solution being rejuvenated; substantially as specified.

5. Apparatus for effecting purification of fuel gas, comprising: a heater, a cooling tower, circulation-means for passing a portion of a purifying solution discharged from the cooling tower to the heater and for recirculating it back to the cooling tower, a container in which gas is purified, and circulation-means for continuously circulating another portion of the solution discharged from the cooling tower through said container and back to the solution flowing to the cooling tower; substantially as specified.

6. Apparatus for effecting purification of fuel gas, comprising: the primary cooler, in which the hot gas is circulated, a cooling tower, circulation-means for passing a portion of a purifying solution discharged from the cooling tower to the primary cooler and for recirculating it back to the cooling tower, a container in which the gas is purified, and circulation-means for continuously circulating another portion of the solution from the cooling tower through said container and back to the solution flowing to the cooling tower, substantially as specified.

7. Apparatus for effecting purification of fuel gas, comprising, in combination: circulating means for a gas purifying liquid, including a gas purification means, heating means, and aeration means, the heating means having means for effecting heating of the purifying liquid and the aeration means having means for effecting aeration of the thus heated foul purifying liquid from the gas purification means; substantially as specified.

8. Apparatus for effecting purification of fuel gas, comprising, in combination: circulating means for a gas purifying liquid, including gas purification and heat exchanger means, and aeration means; the heat exchanger means having means for effecting heating of the purifying liquid by the gas that is treated, and the aeration means having means for effecting aeration of the thus heated foul purifying liquid from the gas purification means; substantially as specified.

9. Apparatus for effecting purification of fuel gas, comprising: a cooling and aerating means, a heating means, means for effecting a continuous circulation of a purifying liquid through both said means, a gas purifying means, and means for continuously withdrawing a portion of such liquid from said aerating means and passing such liquid through the gas purifying means and for subsequently commingling the foul liquid from the purifying means with the liquid flowing to the aerating means; substantially as specified.

10. The process of purifying fuel gas, which consists in maintaining a continuous circulation of a purifying liquid and while such liquid flows subjecting it to heating and aeration treatment; continuously withdrawing part of the liquid from such aeration and passing it in contact with the gas to be purified; and thence commingling the foul liquid from the gas purification with the heated liquid going to the aeration treatment; substantially as specified.

11. The process of purifying fuel gas, which consists in maintaining a continuous circulation of an alkaline purifying liquid and subjecting it to heating and aeration treatment; continuously withdrawing part of the alkaline liquid from such aeration and passing it in contact with the gas to be purified; and thence commingling the foul alkaline liquid from the gas purification with the heated alkaline liquid going to the aeration treatment; substantially as specified.

12. In a fuel gas purification process, the combination of steps consisting in: maintaining a purifying liquid in continuous circulation through an impurity absorption stage and an aeration stage, and passing the purifying liquid in heat exchanging relation with the gas that is treated, and thereby heating the liquid prior to its aeration; substantially as specified.

CHARLES J. RAMSBURG.